(12) United States Patent
Subramanian et al.

(10) Patent No.: US 7,769,663 B1
(45) Date of Patent: Aug. 3, 2010

(54) METHOD AND SYSTEM FOR GENERATING A GLOBAL FINANCIAL MARKET INDEX

(75) Inventors: Raman Aylur Subramanian, Princeton, NJ (US); Arun Kumar, Edison, NJ (US); Giacomo Fachinotti, GY (CH); Valery Rousseau, Bons-en Chablais (FR); Khalid Ghayur, Princeton, NJ (US)

(73) Assignee: Morgan Stanley Capital International, Inc., New York, NY (US)

( * ) Notice: Subject to any disclaimer, the term of this patent is extended or adjusted under 35 U.S.C. 154(b) by 357 days.

(21) Appl. No.: 11/651,766

(22) Filed: Jan. 10, 2007

Related U.S. Application Data

(60) Provisional application No. 60/761,911, filed on Jan. 25, 2006.

(51) Int. Cl.
G06Q 99/00 (2006.01)
(52) U.S. Cl. .................................... 705/36 R
(58) Field of Classification Search ............. 705/35–40
See application file for complete search history.

(56) References Cited

U.S. PATENT DOCUMENTS 7,558,751 B2 * 7/2009 Sauter et al. ............. 705/36 R 2004/0181477 A1 9/2004 Sauter et al.
2006/0149645 A1 7/2006 Wood

OTHER PUBLICATIONS

Guide to Calculation Methods for FTSE All-World Indices , Jan. 2005 (FTSE1).*
Important Changes to FTSE All_World Index Reviews, Apr. 8, 2003 (FTSE2).*
Stock Market Indices, Sep. 2003.*
Amendments to MSCI Equity Index Rebalancing Policy, Press Release, Geneva, May 28, 2002 (MSCI1).*
MSCI Standard Index Series May 2004 Annual Full Country Index Review, Press Release, Geneva, May 11, 2004 (MSCI2).*
MSCI Small Cap Index Series Methodology, Nov. 16, 2005 (MSCI3).*
Morgan Stanley Capital International, Inc. "MSCI Index Calculation Methodology" Nov. 16, 2005.*
"The S&P/Citigroup Global Equity Indices," Standard & Poor's, Oct. 2005.

* cited by examiner

Primary Examiner—Thu-Thao Havan
Assistant Examiner—Thomas M Hammond, III
(74) Attorney, Agent, or Firm—K&L Gates LLP

(57) ABSTRACT

Systems and methods for determining a value for a global market index based on market data of publicly traded companies in a plurality of markets are disclosed. In one embodiment, indices may target a desired market coverage range subject to a universal minimum size range. In another embodiment, the indices may combine elements of percentile, number of companies, and market capitalization cutoff approaches.

25 Claims, 10 Drawing Sheets

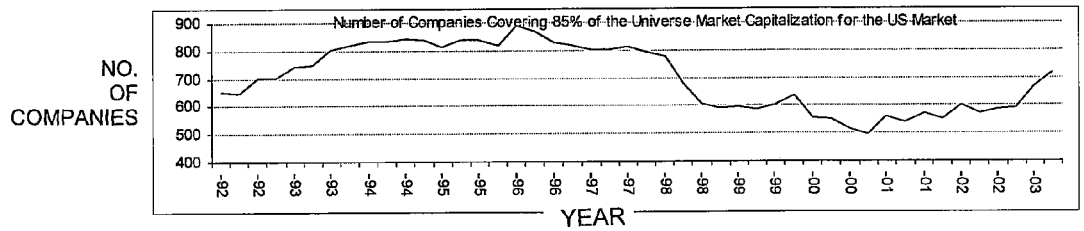
Figure 1
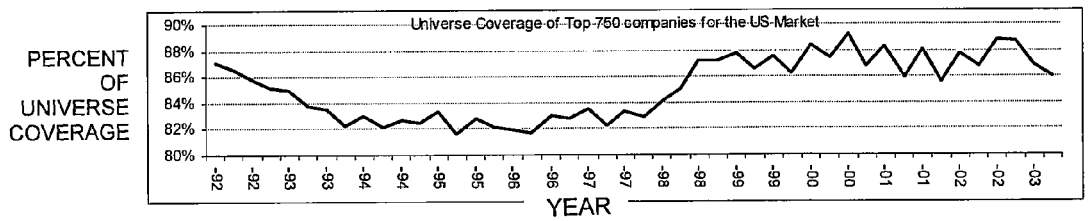
Figure 2
Percentile Coverage at a Full Market Capitalization (USD million) of USD 2 Billion
|  | Canada | USA | Europe ex UK | UK | Japan | Hong Kong | Australia | Singapore | New Zealand |
|---|---|---|---|---|---|---|---|---|---|
| Percentile coverage at USD 2 Billion | 87% | 89% | 92% | 91% | 77% | 80% | 84% | 69% | 57% |
Data as of June 30, 2005
Figure 3

Number of companies by country/region for Developed Markets

| Segment | Australia | Hong Kong | Singapore | New Zealand | Pacific ex Japan | Japan | Europe | EAFE | Canada | USA | World ex Japan | World |
|---|---|---|---|---|---|---|---|---|---|---|---|---|
| Large | 33 | 25 | 3 | 1 | 67 | 159 | 199 | 425 | 48 | 262 | 576 | 735 |
| Mid | 43 | 18 | 15 | 2 | 78 | 204 | 257 | 539 | 61 | 357 | 753 | 957 |
| Enhanced Standard | 76 | 43 | 23 | 3 | 145 | 363 | 456 | 964 | 109 | 619 | 1,329 | 1,692 |
| Enhanced Small Cap | 134 | 75 | 59 | 16 | 284 | 857 | 1,105 | 2,246 | 235 | 2,032 | 3,656 | 4,513 |
| Investable Market Index | 210 | 118 | 82 | 19 | 429 | 1,220 | 1,561 | 3,210 | 344 | 2,651 | 4,985 | 6,205 |

Figure 8

Minimum size at construction: Full Market Cap of Companies

| Segment | Australia | Hong Kong | Singapore | New Zealand | Pacific ex Japan | Japan | Europe | EAFE | Canada | USA | World ex Japan | World |
|---|---|---|---|---|---|---|---|---|---|---|---|---|
| Large | 5,587 | 5,622 | 6,117 | 5,557 | 5,557 | 5,452 | 12,434 | 5,452 | 6,537 | 12,496 | 5,557 | 5,452 |
| Enhanced Standard | 2,029 | 2,287 | 1,864 | 2,630 | 1,864 | 1,977 | 3,842 | 1,864 | 1,698 | 3,877 | 1,864 | 1,864 |
| Investable Market Index | 331 | 331 | 331 | 331 | 331 | 331 | 331 | 331 | 331 | 331 | 331 | 331 |

Figure 9

Cumulative Coverage of Free Float-Adjusted Market Capitalization

| Segment | Australia | Hong Kong | Singapore | New Zealand | Pacific ex Japan | Japan | Europe | EAFE | Canada | USA | World ex Japan | World |
|---|---|---|---|---|---|---|---|---|---|---|---|---|
| Large | 67.4% | 70.2% | 54.8% | 28.6% | 66.0% | 68.9% | 73.1% | 71.5% | 70.1% | 69.7% | 70.7% | 70.5% |
| Mid | 17.7% | 13.1% | 20.5% | 20.5% | 17.0% | 15.3% | 14.7% | 15.0% | 14.5% | 14.9% | 14.9% | 15.0% |
| Enhanced Standard | 85.1% | 83.3% | 75.2% | 49.1% | 83.0% | 84.2% | 87.7% | 86.5% | 84.6% | 84.7% | 85.6% | 85.5% |
| Enhanced Small Cap | 12.9% | 12.2% | 19.5% | 48.2% | 14.0% | 13.1% | 11.0% | 11.8% | 13.4% | 14.2% | 13.1% | 13.1% |
| Investable Market Index | 98.0% | 95.5% | 94.7% | 97.3% | 97.0% | 97.3% | 98.7% | 98.2% | 98.0% | 98.9% | 98.7% | 98.6% |

All market caps are in USD millions. Data as of September 30, 2006.
Note: Developed Markets Universal Minimum Size Reference for Large Cap is USD 10,861 million, for Standard is USD 3,652 million and USD 331 million for Small Cap.

Figure 10

Large + Mid

| | AU | HK | SG | NZ | Pac Ex JP | JP | GB | EU ex UK | EAFE | CA | US | World | Current Standard : World |
|---|---|---|---|---|---|---|---|---|---|---|---|---|---|
| Number of Companies | 75 | 40 | 20 | 5 | 140 | 400 | 125 | 325 | 990 | 105 | 750 | 1,845 | 1,807 |
| Coverage of Universe Float Market Cap | 86.8% | 85.1% | 76.5% | 59.8% | 84.7% | 83.0% | 88.2% | 88.6% | 86.9% | 88.5% | 86.8% | 86.9% | 83.2% |
| Minimum Full Market Cap | 1,430 | 1,500 | 1,500 | 1,500 | 1,430 | 1,465 | 3,005 | 3,050 | 1,430 | 1,555 | 2,725 | 1,430 | 422 |

Note: All market capitalization are in USD million. Data as of June 30, 2005

Fig. 13

Small Cap

| | AU | HK | SG | NZ | Pac Ex JP | JP | GB | EU ex UK | EAFE | CA | US | World | Current Small Cap : World |
|---|---|---|---|---|---|---|---|---|---|---|---|---|---|
| Number of Companies | 110 | 80 | 50 | 15 | 255 | 950 | 300 | 600 | 2,105 | 120 | 1,750 | 3,975 | 1,899 |
| Coverage of Universe Float Market Cap | 10.5% | 11.2% | 19.1% | 27.5% | 12.0% | 13.4% | 10.3% | 9.7% | 10.9% | 9.0% | 11.5% | 11.2% | 4.9% |
| Minimum Full Market Cap | 235 | 213 | 285 | 240 | 213 | 215 | 263 | 289 | 213 | 225 | 321 | 213 | 100 |

Note: All market capitalization are in USD million. Data as of June 30, 2005

Fig. 14

Large+Mid+Small (less overlap)

| | AU | HK | SG | NZ | Pac Ex JP | JP | GB | EU ex UK | EAFE | CA | US | World | Current Standard+ Small Cap(less Overlap) : World |
|---|---|---|---|---|---|---|---|---|---|---|---|---|---|
| Number of Companies | 185 | 120 | 70 | 20 | 395 | 1,350 | 425 | 925 | 3,095 | 225 | 2,500 | 5,820 | 3,497 |
| Coverage of Universe Float Market Cap | 97.3% | 96.3% | 95.6% | 87.2% | 96.7% | 96.4% | 98.5% | 98.4% | 97.8% | 97.5% | 98.3% | 98.0% | 87.2% |
| Minimum Full Market Cap | 235 | 213 | 285 | 240 | 213 | 215 | 263 | 289 | 213 | 225 | 321 | 213 | 100 |

Note: All market capitalization are in USD million. Data as of June 30, 2005

Fig. 15

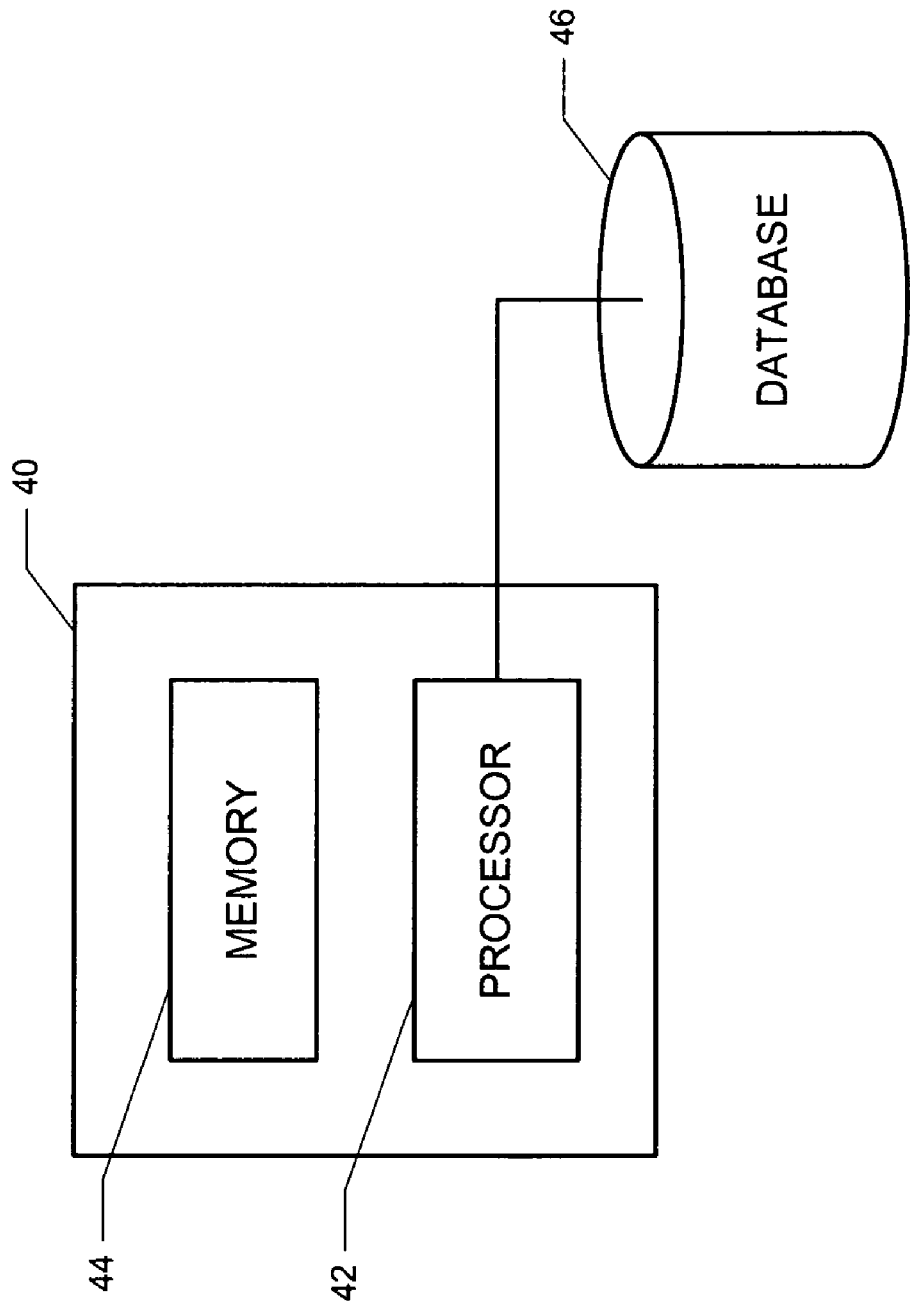

METHOD AND SYSTEM FOR GENERATING A GLOBAL FINANCIAL MARKET INDEX

CROSS-REFERENCE TO RELATED APPLICATIONS

The present application claims priority under 35 U.S.C. §119(e) to U.S. Provisional Patent Application Ser. No. 60/761,911, filed Jan. 25, 2006, entitled "Method Of Generating A Global Financial Market Index," by Raman Aylur Subramanian et al., which is incorporated herein by reference.

BACKGROUND

In the financial sector, an index is a statistical indicator providing a representation of the value of the securities which constitute the index. They are commonly used to serve as barometers for a given market or industry. In that connection, indices are commonly used as benchmarks against which financial or economic performance is measured, such as the performance of an investment fund (such as a mutual fund or pension fund). As the number and diversity of the investment processes of funds have grown, there is a need for indices that can more reliably measure the performance of the various funds.

Currently there exist three general approaches for such indices: the fixed-percentile approach, the fixed-number-of-companies approach, and the fixed-market-cap-cutoff approach. In the fixed-percentile approach, the constituents of an index typically include the publicly traded companies that make up a certain percentage of a given market or sector by market capitalization. For example, for a large capitalization market segment, the index may include the top 70-85% by market capitalization, a mid-cap segment may include the next 15%, and a small-cap segment may include the next 13% (the bottom 2% or so may be excluded because of illiquidity). The percentile cutoffs can be applied at a country or regional level. Examples of global indices using a fixed-percentile approach are the S&P/Citigroup Global Equity Indices and the FTSE Global Equity Indices.

International equity indices based on the percentile approach provide the benefit of consistent country representation; each country's weight reflects the proportional size of its market, and each country's weight is identical across size composites. However, the fixed-percentile approach offers very little size integrity within each size segment. For example, for a large cap index with 85% coverage, the company at the $85^{th}$ percentile in one country may have a market capitalization of USD 3 billion, but the company at the $85^{th}$ percentile in another country may only have a market capitalization of USD 0.9 billion. In addition, there may be poor index stability in a fixed-percentile index as the number of companies in the index may vary greatly over time, as shown in the example in FIG. 1. This figure shows that the number of companies covering 85% of the market capitalization of the U.S. market varied from between about 500 and 900 companies for the years 1992 to 2003.

In the fixed-number-of-companies approach, the number of constituent companies in the index is fixed. For example, in the U.S., the top 750 companies by capitalization could be chosen to depict the large and mid-cap market segments, with the next 1750 forming the small-cap segment, and together the 2500 companies comprising the investable market index. Examples of fixed-number-of-companies indices are the Russell 2000, the Dow Jones Industrial Average, and the S&P 500 Equity Index. An example of a global fixed-number-of-companies index is the S&P Global 1200 and the Dow Jones STOXX Global 1800 Index. The S&P Global 1200 is an aggregation of seven country/regional S&P indices capturing approximately 70% of the world equity market capitalization.

Fixed-number-of-companies indices provide good index stability and low turnover. But both country representation and size cutoffs may vary widely over time. FIG. 2 shows the percentile market cap coverage for the top 750 companies in the U.S. from 1992 to 2003. As can be seen, the percentile market cap coverage varied from about 82% to 90% in this time period. And this is just for one country. Similar—or even more extreme—variations may exist in other countries that are part of a global fixed-number-of-companies index for the same time period.

In the fixed-market-cap-cutoff approach, size segments in the indices are based on a fixed market capitalization level. For example, a USD 2 billion cutoff could be used to define large and mid-cap companies, while companies below that level, but with a capitalization of at least USD 200 million, could be included in a small-cap index. An example of a suite of global fixed-market-cap-cutoff indices is the S&P/Citigroup Cap Range Indices. An advantage of fixed-market-cap-cutoff indices is that they provide near perfect size integrity—every constituent company in the index meets the market-cap cutoffs. A potential drawback of fixed-market-cap-cutoff indices is that they sometimes provide varying country composition within a size segment, as shown in the example of FIG. 3. This chart depicts the market capitalization percentile coverage for companies having a market capitalization of USD 2 billion or greater for a number of countries. As can been seen, the percentile coverages of the different countries vary from 57% to 92%.

As index needs of investors seeking international diversification have evolved over time, new indices utilizing one of the three general approaches have been created. In response to investor needs for size segment representation, MSCI (Morgan Stanley Capital International) introduced the International Small-cap index in 1998 and increased the targeted coverage of the Standard indices to 85% from 60%. The MSCI International Small-cap index targets 40% coverage of the float market capitalization of companies in the full market capitalization size range from $200 million to $1.5 billion.

Meaningful changes in international investing (such as increased liquidity, greater access to international markets, increased sophistication and specialization of asset managers and owners, and shifts from individual national markets to regional markets) continue to occur. In addition, the recent performance disparities across different segments of the international financial markets has led investors to seek the ability to focus on specific size (e.g., large-, mid-, small-cap) and style (e.g., value, growth, etc.) segments of the market, as well as the performance of the entire opportunity set (since missing some segments may affect the overall performance of the portfolio). Since the current state of the art applies only one approach in index construction—percentile, number of companies, or US dollar cutoff—current indices cannot address all the needs of investors who desire deeper coverage and granular segmentation without sacrificing index stability, size integrity, and consistent country representation. Indices that provide broader coverage (i.e., more companies covering more of each market) and that allow for meaningful size and style segmentation are needed to address these changing circumstances.

SUMMARY

In one general aspect, the present invention is directed to methods and systems for determining a value for a global market index based on market data (e.g., stock prices) of publicly traded companies in a plurality of geographic regions (or markets). Indices created using the methodology of the present invention may target a desired market coverage range (based on the type of index) in each market subject to a universal minimum size range. In that way, the indices may balance size integrity and market coverage at the same time rather than choosing one or the other.

The method of determining the value of a global market index according to one embodiment of the present invention may comprise the step of determining a universal minimum size range for the index in terms of market capitalization ("market cap"), for example. The minimum size range may be based on a universal minimum size reference that is derived from the full market capitalization of the company at a target percentile of the aggregated market coverage of chosen markets (say Developed Markets) that may be chosen based on the nature of the index. For example, for a large cap index, the cutoff percentile may be the $70^{th}$ percentile. For a standard index (e.g., large and mid cap combined), the $85^{th}$ percentile may be used as the minimum size reference. For an investable market index (e.g., large, mid, and small cap combined), the $99^{th}$ percentile may be used in each market.

The method may also comprise determining a market coverage range for the index. Again, the market coverage range may vary based on the nature of the index. For example, the market coverage range may be centered around 70% for a large cap index, 85% for a standard index, and 99% for an investable market index.

The intersection of minimum size range and the market coverage range define a target area that is used to strike a balance between size integrity and market representation. For each market in the index having one or more companies that fall within the target area, a threshold company may be selected to be the smallest company, by full market capitalization, in the index for the geographic region. Thus, for each market in the index having one or more companies that fall within the target area, the index would comprise the threshold company and all companies having a market cap greater than the threshold company. The threshold company may be chosen such that it provides a targeted coverage of that market which falls within the market coverage range. For each market (if any) in the index that do not have any companies in the target area, the company that has the smallest market capitalization that is not less than a minimum market cap may be selected as the threshold company, sacrificing market coverage for size integrity in such an embodiment.

The identity and number of companies for each geographic region in the index having been determined, the method may further comprise the step of computing the value of the index based on market data (e.g., stock price) for the companies comprising the index. According to various embodiments, a value-weighted formula based on market capitalization may be used to compute the value for the index.

In another general embodiment, the index may combine elements of percentile, number of companies, and market capitalization cutoff approaches. According to such embodiments, the method may comprise the step of, for each of the geographic regions to be included in the global market index, ranking the publicly traded companies in the region based on a selected financial parameter, such as market capitalization (although other parameters or a combination of parameters could be used). The method may then comprise the step of identifying the companies to be used in the index. This may be performed by, for each region included in the global market index, aggregating the values for the selected financial parameter (e.g., market capitalization) for the ranked publicly traded companies, starting with the company having the highest ranking and proceeding in sequential descending order, until the aggregated value reaches either a selected aggregate threshold or until a minimum company threshold for the selected parameter is reached. When either the selected aggregate threshold or the minimum company threshold is reached, the number and identity of the companies included in the index are determined (subject to rounding if desired). The value of the index may then be computed based on, for example, market data (e.g., stock price) for the companies comprising the index.

Other aspects of the present invention are directed to related computer systems for constructing and computing the value for global market indices and to computer-readable medium storing instructions for causing a processor to construct and/or compute the indices.

FIGURES

Various embodiments of the present invention are described herein by way of example in conjunction with the following figures wherein:

FIG. 1 is a chart showing the number of companies covering 85% of the market capitalization universe for the U.S. market for the years 1992 to 2003;

FIG. 2 is a chart showing the percent universe coverage by market capitalization for the top 750 companies for the U.S. market from 1992 to 2003;

FIG. 3 is a table showing the percentile coverage for companies having a market capitalization of USD 2 billion or greater for various geographic regions;

FIGS. 8-10 are tables showing the number of companies, the minimum size, and cumulative coverage, respectively, for example indices generated using the process of FIG. 4 according to various embodiments of the present invention;

FIGS. 13-15 are tables showing the number of companies, universe coverage, and minimum market capitalization, respectively, for example indices generated using the process of FIG. 12 according to various embodiments of the present invention; and FIG. 16 is a diagram of a computer system according to embodiments of the present invention.

DETAILED DESCRIPTION

Aspects of the present invention are generally directed to systems and methods for constructing global financial indices and for computing the value for the indices. The indices may be based on trading data (e.g., the stock price) for securities of publicly traded companies in a number of geographic regions or markets. The index may cover both developed markets or emerging markets or both.

Figure 4:
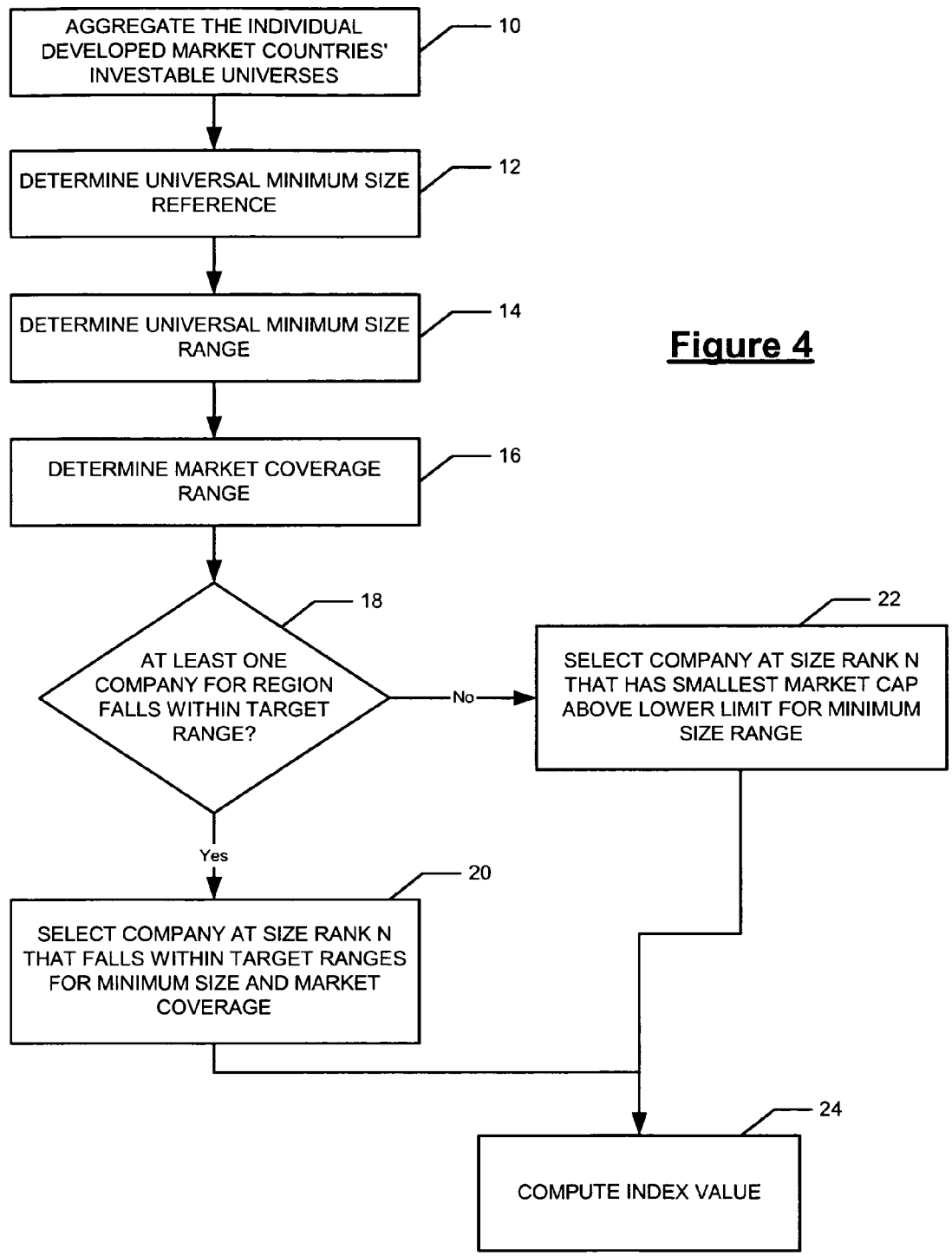
FIG. 4 is a diagram of a process for constructing and calculating a value for a global financial market index according to various embodiments of the present invention.

FIG. 4 is a diagram of a process for generating and computing a value for a global market index according to one embodiment of the present invention. The process starts at block 10, where the investable universes for markets that are part of the index are aggregated to create a global investable universe. According to one embodiment, the investable universe may be aggregated for the developed markets in the index, even through the index may also include emerging markets. For example, the global market may be designed to comprise companies from the following developed markets: US; Canada; Japan; Europe; New Zealand; Singapore; Hong Kong; and Australia. At step 10, therefore, the investable market caps for each of these markets would be aggregated.

At block 12, a universal minimum size reference is determined. The minimum size reference may be determined from the global investable universe. The minimum size reference may be determined based on the type of global index being constructed, such as a large cap index, a standard index (e.g., large and mid cap combined), or an investable market index (e.g., large, mid and small cap combined). Also, the minimum size reference may vary by geographic region based on whether, for example, the geographic region is a developed market or an emerging market. That is, there may be one minimum size reference for developed markets and another for emerging markets for an index that includes both developed and emerging markets.

According to various embodiments, the minimum size reference may be a desired percentile of companies ranked according to market cap. For example, for a large cap index, the minimum size reference may be the $70^{th}$ percentile of the global investable universe (e.g., excluding the bottom 30% by market cap), which was a market capitalization of about USD 10.88 billion as of September 2006. For a standard index, the minimum size reference may be the $85^{th}$ percentile, which was about USD 3.65 billion as of September 2006. For an investable market index, the minimum size reference may the $99^{th}$ percentile of the global investable universe, which was about USD 331 million as of September 2006. The minimum size reference for emerging markets may be a fraction, such as one-half, of the minimum size reference for the developed markets, or it can be independently derived from the Emerging Markets universe. Using the above example, therefore, the minimum size reference for emerging markets may be USD 5.44 billion for a large cap index, USD 1.83 billion for a standard index, and USD 166 million for an investable market index.

At step 14, a minimum size range may be determined. As described further below, the smallest company included in the index for each geographic region of the index preferably is within the size range to thereby provide size consistency for the index. The size range may be determined based on the minimum size reference. For example, according to one embodiment, the minimum size range could be 0.5 to 1.25 of the minimum size reference. Using the above described examples for large cap, standard, and investable market indices, the minimum size range for the various indices may be as follows:

|  | DM Minimum Size Reference (USD millions) | DM Minimum Size Range (USD millions) | EM Minimum Size Reference (USD millions) | EM Minimum Size Range (USD millions) |
|---|---|---|---|---|
| Large Cap | 10,881 | 5440 to 13,601 | 5440 | 2720 to 6800 |
| Standard | 3,652 | 1826 to 4565 | 1826 | 913 to 2282 |
| Investable Market | 331 | 166 to 414 | 166 | 83 to 413 |

Of course, in other embodiments, different ranges based on the minimum size reference could be used. The 0.50 to 1.25 times the minimum size reference is just an example of a minimum size range that could be used.

At step 16, a minimum market coverage range may be determined. Preferably, a sufficient number of companies from each region are selected for the index so that the market coverage for each region falls within the market coverage range. The market coverage range may be selected based on the type of index being generated. For example, the market coverage ranges may be as follows:

| Index | Market Coverage Range |
|---|---|
| Large Cap | 65% to 75% |
| Standard | 80% to 90% |
| Investable | 98.5% to 100% |

Thus, in this example, the large cap market coverage range is 70%±5%, the standard index range is 85%±5%, and the investable market range is 98.5%-100%. Of course, these ranges are examples and in other embodiments different ranges could be used.

Figure 5:
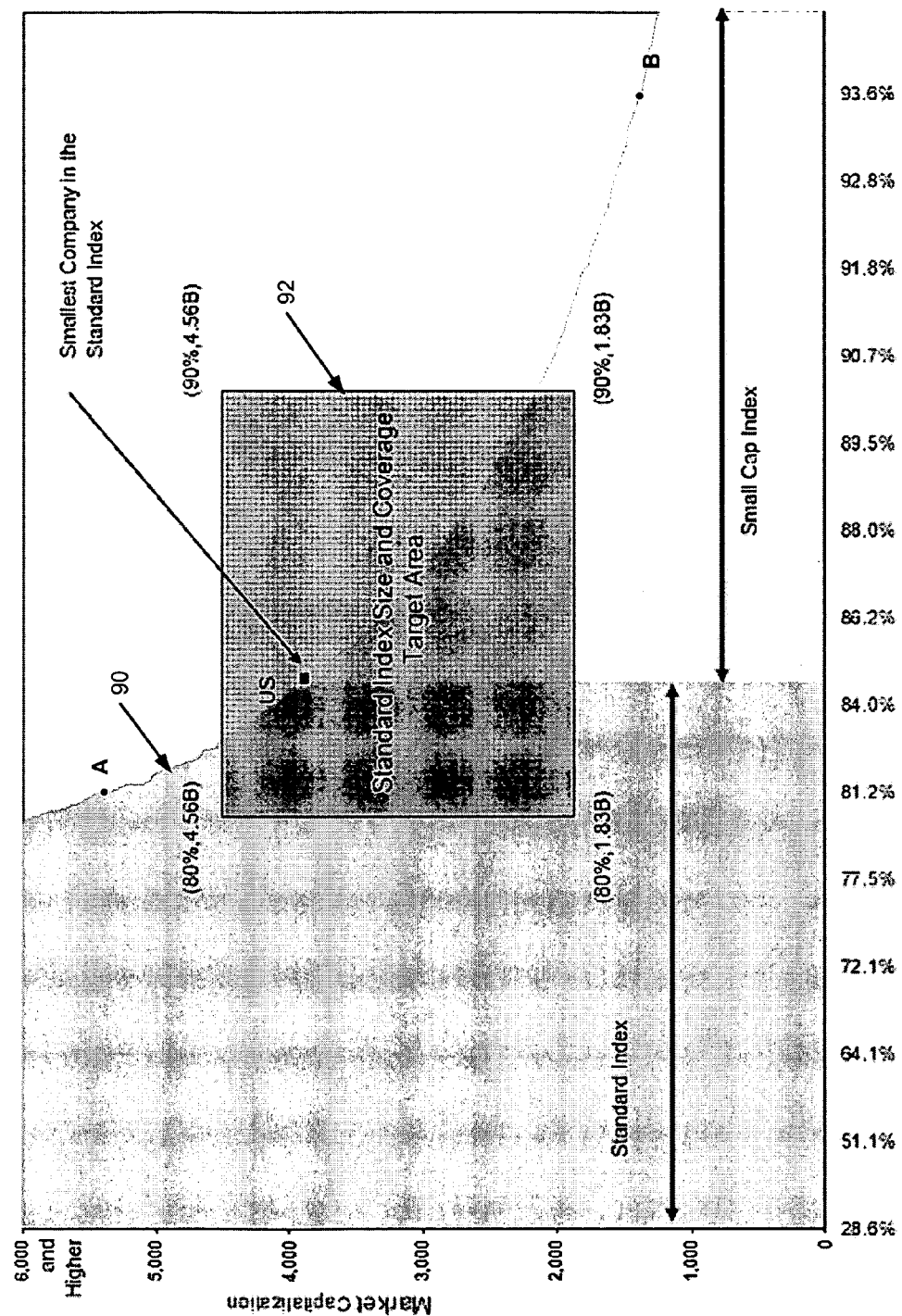
FIGS. 5-7 and 11 are charts showing a target area for size and market coverage according to various embodiments of the present invention.

The minimum size range and market coverage range establish a target area that may be used when determining the companies to be included in the index at inception in order to strike a balance between size integrity and market coverage. FIG. 5 shows a graphical representation of an example target area. The y-axis in this graph is market capitalization in USD millions and the x-axis is cumulative market coverage. The curve 90 shows the cumulative market coverage as the market capitalizations of companies are summed in sequential descending order starting with the company having the highest market capitalization. The example of FIG. 5 shows, for example, that to achieve a market coverage of 81.2%, the companies having a market cap equal to or greater than about USD 5,500 million must be aggregated (shown by point A in the graph) and to achieve a market coverage of 93.6% requires that the companies having market caps equal to or greater than about USD 1,300 million must be aggregated (denoted by point B).

The target area for the above-described example standard index is denoted graphically by the hatched rectangle 92. The boundaries of the target area 92 in terms of size (the y-direction) are approximately USD 1830 million and USD 4560 million, corresponding to 0.50 to 1.25 times the minimum size reference for a standard index (approximately USD 3,650 for a standard index in this example). The boundaries of the target area 92 in terms of market coverage (the x-direction) are 80% to 90% for this example.

Referring back to FIG. 4, at step 18 it is determined, for each region that is part of the index, whether any companies in that region are within the target area 92 for the index. If so, at step 20, one of the companies (the threshold company) is selected to be the smallest company (by market cap) in the index for that region. Thus, assuming that the selected threshold company is the Nth largest company in terms of market capitalization in the region, the index at construction may include the N largest companies by market capitalization in the region.

If a market has more than one company in the target area 92, the company closest to the target market coverage may be selected to be the smallest company in the index for the market at construction of the index. The target market coverage may be 70% for a large cap index, 85% for a standard index, and 99% for an investable market index, for example. Of course, in other embodiments, different target market coverages may be used. Also, different ways of selecting the threshold company could be used. For example, the company in the target area having the smallest market cap that is not less than the minimum size reference could be used.

Figure 6:
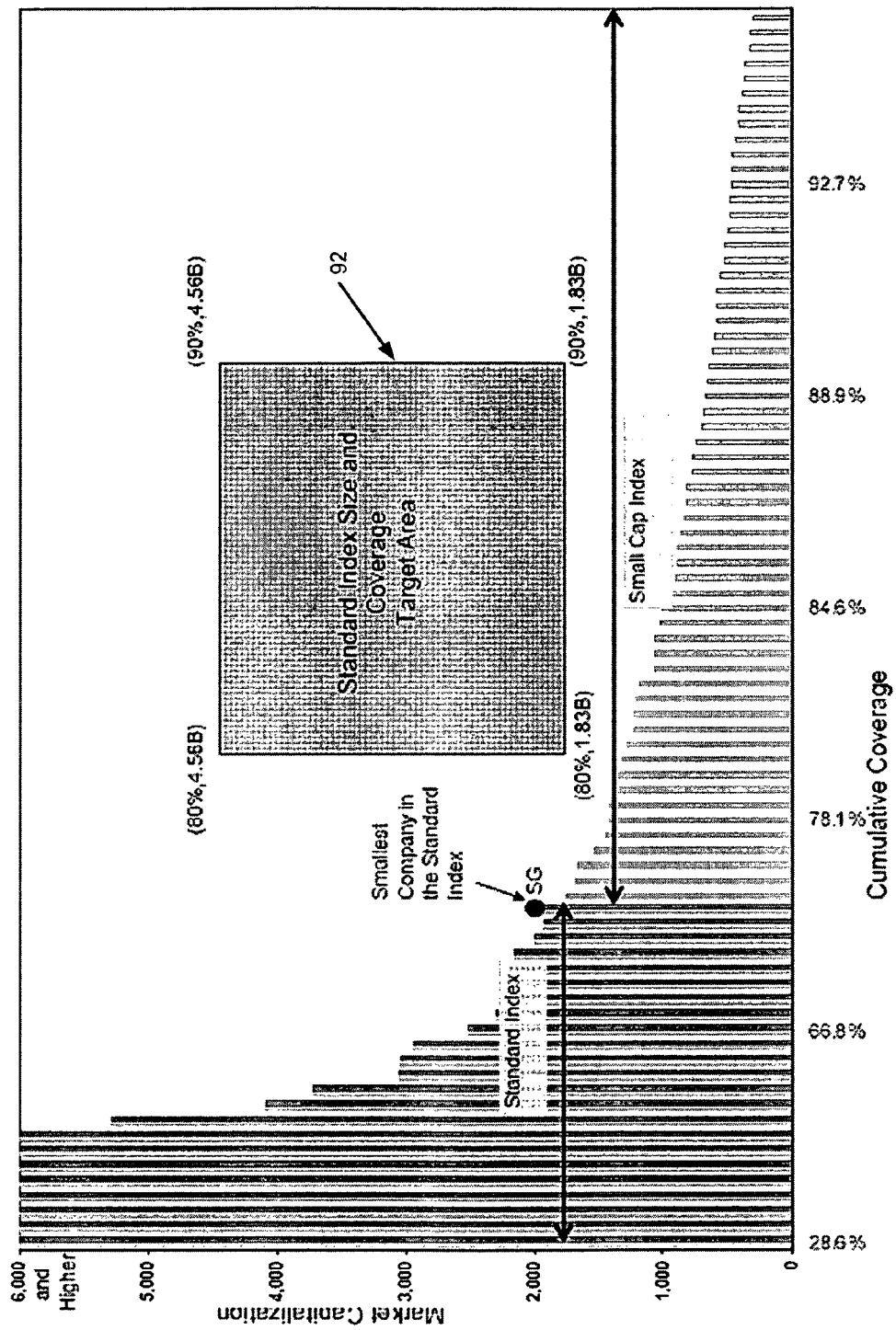

If at step 18 it is determined that a particular region has no companies in the target area, in order to preserve size integrity for the index, at step 22, the company having the smallest market cap above the lower bound for the market cap range may be selected to be the threshold company in the index for that region. An example of this featuring Singapore is shown in FIG. 6. Singapore has no companies in the target area 92 in this example. So the smallest company having a market cap greater that the lower bound of the minimum size range, USD 1.83 billion in this example, is selected as the smallest company in the index for Singapore. According to other embodiments, the company providing a market coverage closest to the target market coverage could be used.

Figure 7:
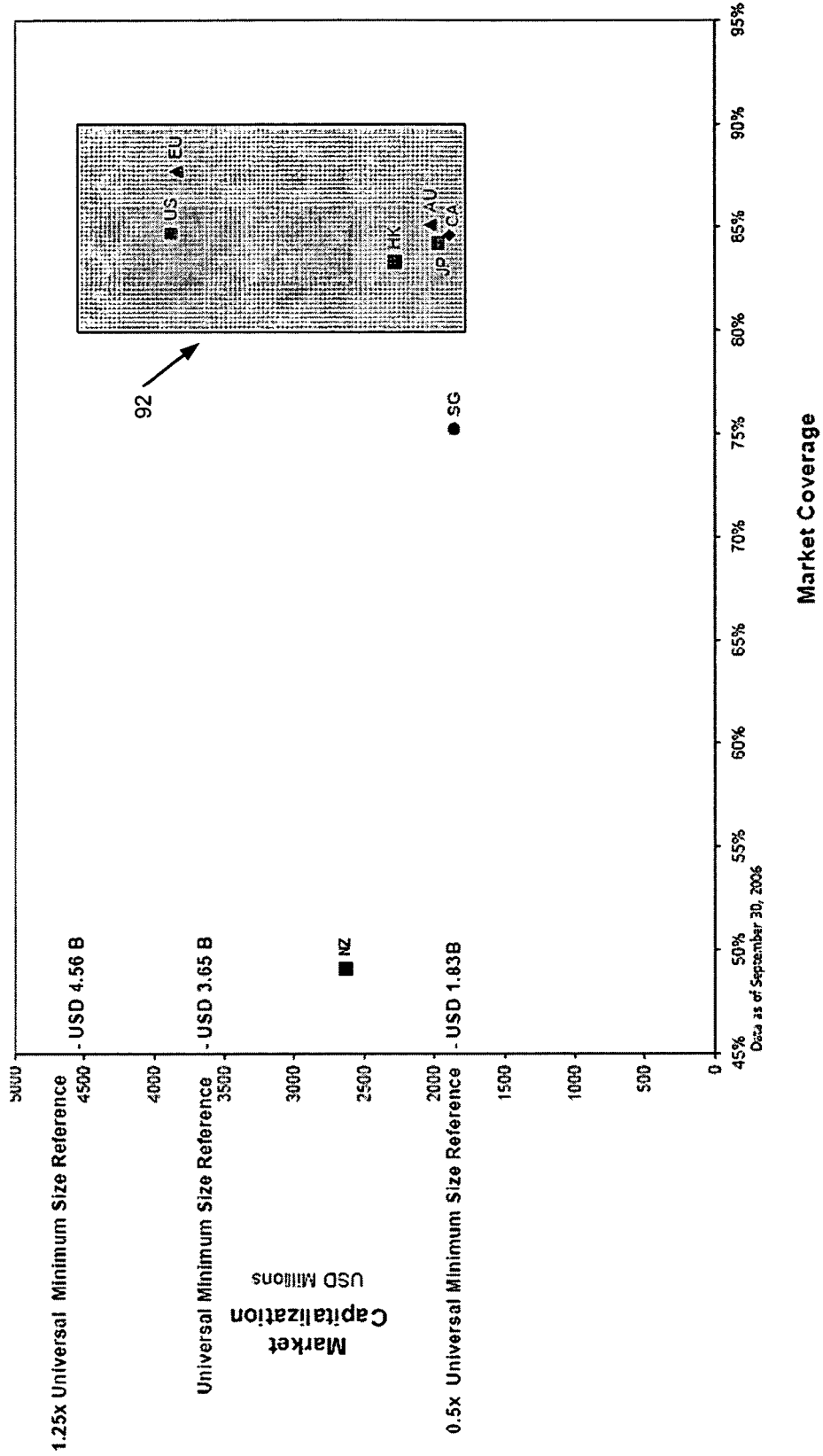

The steps of 18-22 are repeated for each market in the index. The result of this process is the number and identity of the companies included in the index for each market at inception. FIG. 7 is a graph showing how a balance between size integrity and market representation (coverage) can be achieved for an example standard index comprising the following developed markets: US; Europe (EU); Hong Kong (HK); Australia (AU); Japan (JP); Canada (CA); New Zealand (NZ); and Singapore (SG). As shown in FIG. 7, a balance between size integrity and market representation falling within the target area is achieved for all of these developed markets except New Zealand and Singapore, which had no companies in the target area 92.

FIG. 8 is a chart showing the number of companies in various exemplary global indices at construction for indices constructed for indices constructed according to such an embodiment. The chart of FIG. 8 shows the number of companies from each region for a large cap index, a mid cap index (e.g., standard index but excluding the large cap segment), a standard index (e.g., large cap plus mid cap), a small cap index (e.g., investable market excluding the standard segment), and an investable market index. This chart shows that the example standard index would comprise 1,692 companies worldwide and that the example investable market index would comprise 6,205 companies worldwide.

FIG. 9 shows the market cap for the smallest company in each region for each index at construction. As can be seen in this example, the smallest company in the large cap index ranges by market from a market cap of USD 5,452 million (Japan) to USD 12,496 million (US). For the standard index, the smallest company ranges by market from USD 1,864 million (Singapore) to USD 3,877 million (US). For the investable market index, the smallest companies in the index all have a market cap of about USD 331 million.

FIG. 10 shows the market coverage by (free float-adjusted) market capitalization in each region for each index at construction. As can be seen in this example, the market coverage for the large cap index ranges from 28.6% (New Zealand) to 73.1% (Europe), and that the worldwide market coverage is 70.5%. For the standard index, the market coverage ranges from 49.1% (New Zealand) to 87.7% (Europe), and that the worldwide market coverage is 85.5%.

Figure 11:
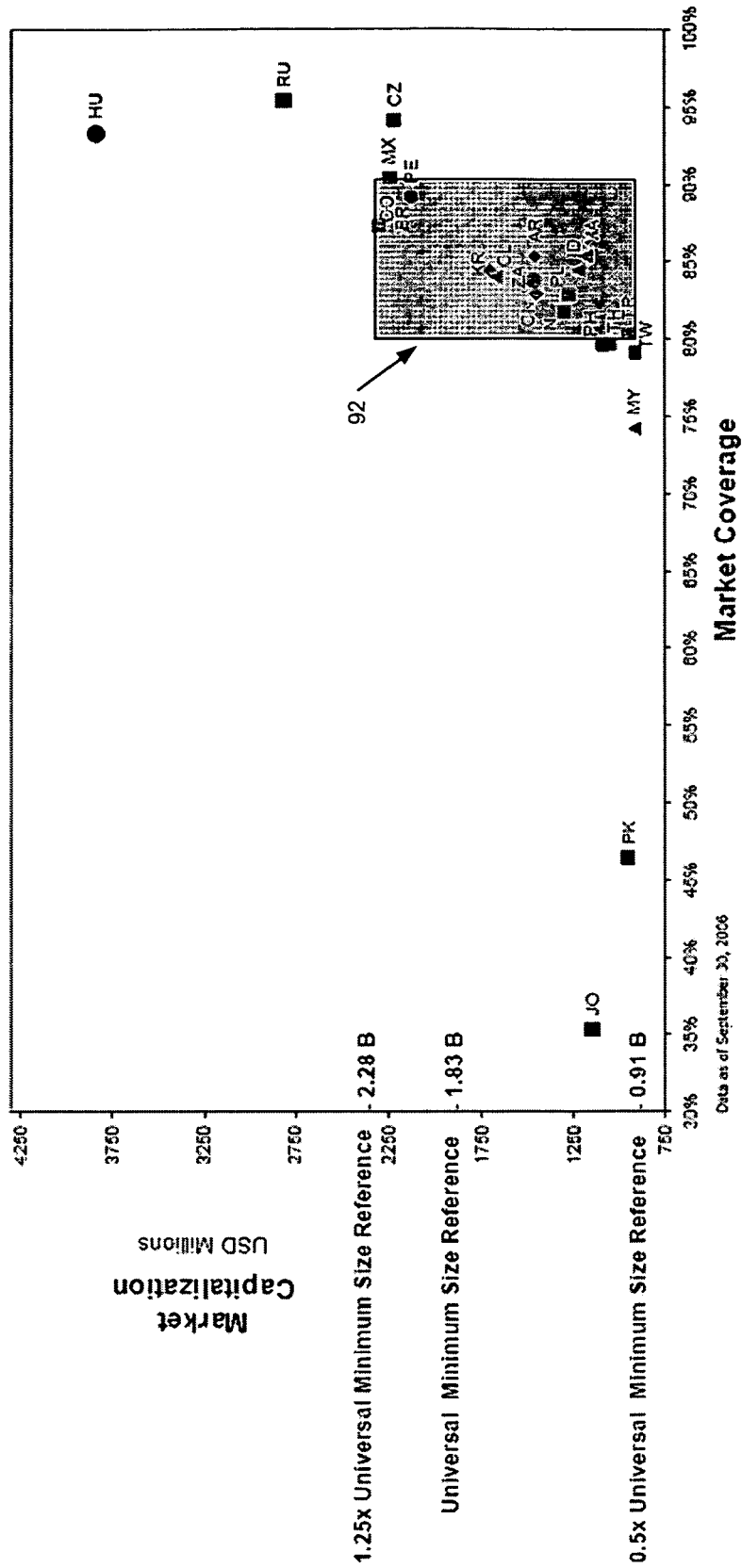

FIG. 11 shows the target area 92 for a standard index for emerging market regions that may be included in the index. The market coverage range may remain 80% to 90% for a standard index for emerging companies, but as described above the minimum size range may be lower than for developed markets. In this example, the minimum size range is USD 0.91 billion to USD 2.28 billion, determined based on 0.50 to 1.25 times the minimum size reference for the emerging companies, which is USD 1.83 billion in this example, (one-half the minimum size reference for developed markets). For most of the emerging market countries, a balance between market representation and size integrity is achieved in this example. Several markets in this example, however (namely Jordan (JO), Pakistan (PK), Malaysia (MY), Philippines (PH), Taiwan (TW), and Thailand (TH)), fall short of the 80% minimum market coverage due to the size integrity constraint. Also, several countries, namely Mexico (MX), Czech Republic (CZ), Hungary (HU), and Russia (RU), exceed the 90% market coverage limit in this example, due to high concentration in these markets.

Returning back to FIG. 4, the number and identity of the companies to be included in the index at inception having been determined at steps 20-22 for each region that is part of the index, the index value can then be determined at step 24. The index value may be computed based on market data (e.g., stock prices) for the companies in the index. The value may be computed using price-weighted, value-weighted or equal-weighted formulas. For a price-weighted index, the index value may be computed as:

$$IndexValue_t = \frac{1}{d_t} \sum_i P_{i,t}$$

where IndexValue$_t$ is the value of the index at time t, $P_{i,t}$ is the price of the stock of company i at time t, and $d_t$ is the divisor, which in a price-weighted index may be related to the number of stocks in the index (with adjustments for stock splits, etc.).

For a value-weighted index, the selected weighting scheme could be based on market capitalization (whether absolute or free flood-adjusted). For an embodiment using absolute market cap weighting, the index value may be computed as:

$$IndexValue_t = IndexValue_{t-1} \sum_i w_{i,t} \frac{P_{i,t}}{P_{i,t-1}}$$

where $$w_{i,t} = \frac{P_{i,t-1} N_{i,t-1}}{\sum_i P_{i,t-1} N_{i,t-1}}$$

In this formula, the relative market capitalization of company i in the previous period is denoted with $w_{i,t-1}$ and $N_{i,t-1}$ is the number of shares outstanding in the previous period for company i.

For an equal-weighted index, the index gives each of the n companies in the index the same weight and may be computed as:

$$IndexValue_t = IndexValue_{t-1} \frac{1}{n} \sum_i \frac{P_{i,t}}{P_{i,t-1}}$$

After construction, the index value may be computed periodically, such as every day. Also, according to various embodiments, indices created using the above-described process may be rebalanced periodically, such as semi-annually or quarterly, in order to reflect changes in the opportunity set in a timely manner while managing index stability and turnover. During rebalancings, the universal minimum size reference, and hence the minimum size ranges, may be reset by referring to the rank of the company that provides the previous universal minimum size reference. For example, if the smallest company in the index for a particular market was the 1700$^{th}$ largest company by market capitalization in the market, then at the rebalancing, the minimum size reference could be reset to be the size (by market cap) of the 1700$^{th}$ largest company in the market at the time of the rebalancing. Of course, there may also be limits on how much the minimum size reference can change in a single rebalancing.

Index stability may also be managed, in one embodiment, by keeping the companies in the indices unchanged at rebalancing so long as the size and coverage target area boundaries are not violated. For example, if two companies in the index merge such that the number of companies in the index is reduced from N to N−1, if the size and coverage ranges are still satisfied with the N−1 largest companies, the number of companies in the index may remain N−1. If a change in the number of companies is indicated, in one embodiment, no more than 5% of the companies is added or deleted in a single rebalance. In some market specific instances, a large change, such as 10%, may be implemented to ensure faster achievement of size integrity and coverage. Buffer procedures, which are known in the art, may be used when adding and removing companies from size segments in the index to reduce turnover due to the movement of companies in terms of market capitalization size around the boundaries between size segments.

According to various embodiments, additional company screens may be used. For example, to ensure investability and replicability of size segments, a company's free float-adjusted market capitalization may be required to be at least 50% (or some other percentage) of the minimum size cut-off for that market. However, in some emerging markets, companies which are significant in the context of the domestic equity universe may not meet this requirement because of low float. In these cases, the float requirement may be lowered to, for example, 30% of the minimum size cut-off and companies may be added provided the free float market cap of the company is at least 1% of the free float market capitalization of the investable universe in that market. Other screens may also be used. For example, according to various embodiments, companies included in the index may need to meet or exceed a minimum annualized traded value ratio (ATVR), such as 20% for developed markets and 15% for emerging markets. Also, there may be a minimum free float. Also, there may be a seasoning requirement. For example, there may be a requirement that companies included in the index must be public a certain period of time (e.g., three months since their IPO).

Mid cap and small cap indices can also be constructed using the above-described methodologies. A mid cap index may comprise the companies in the standard index but excluding the companies in the large cap index. A small cap index may include the companies in the investable market index, excluding the companies in the standard (large and mid cap) index.

Figure 12:
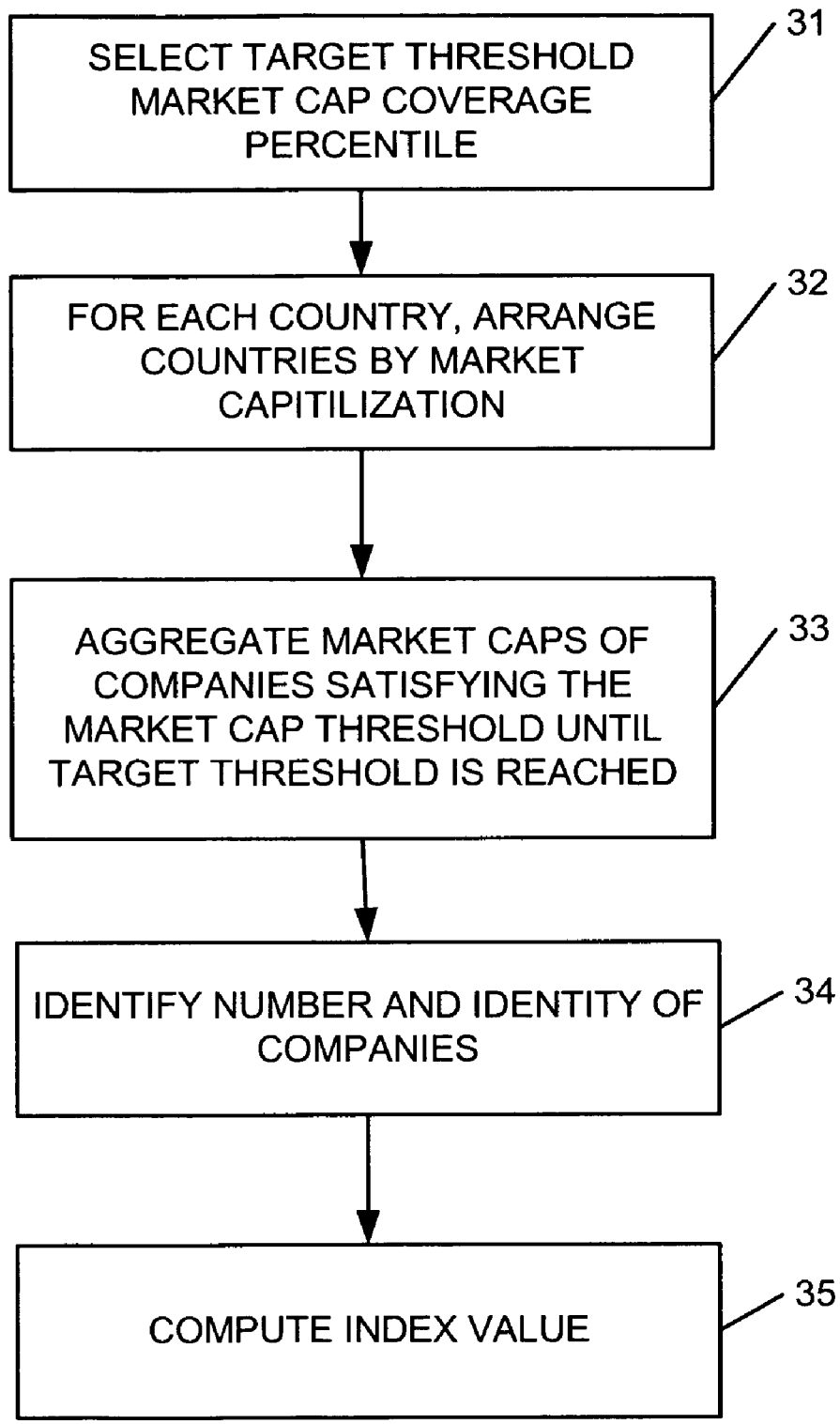
FIG. 12 is a diagram of a process for constructing and calculating a value for a global financial market index according to another embodiment of the present invention.

According other embodiments, rather that using a target area for size and market coverage, the indices may be generated using a number of companies approach that targets a desired market coverage with minimum size cutoffs. Such a process permits the generation of global market indices that achieve: (1) index stability, through the use of a fixed number of companies; (2) size integrity, by using minimum size guidelines globally or regionally; and (3) consistent country representation by choosing the number of companies at the inception of the index, to target identical coverages of the market, and by maintaining stability in country representation over time through periodic review of, and adjustment in, the number of companies. FIG. 12 is a diagram of a process for generating an index according to such embodiments. The process starts at step 31, where a target market coverage for the index is selected. For an investable market fund, the target market converge could be, for example, 99%. For a large cap index, the target market coverage could be 70%, for example, and for a standard index, the target market coverage could be 85%.

At step 32, for each constituent country or region in the global index, the publicly traded companies in that country or region are ranked in descending order by market capitalization (or, in other embodiments, some other parameter or combination of parameters). Next, at step 33, for each country or region in the index, the market capitalizations of the companies in the country or region are aggregated, starting with the highest and proceeding in sequential descending order, until the desired market coverage is reached (or approximately reached), provided that the market cap size constraint for the index is satisfied. Thus, the market caps are summed in descending sequential order until either the desired market coverage is reached or the company size (by market cap) constraint is reached. The result for some smaller markets may be that the target market coverage is not reached, as shown in examples described below. For an investable market index, the index may include companies with a market capitalization greater than USD 200 million.

At step 34, based on the results of step 33, the number and the identity of the companies for each country or region used in the index that is needed to approximately reach the target coverage threshold is determined. Then, at step 35, the value of the index may be computed. Again, the value market may be based on the stock price of the companies included in the index, and different or no weighting adjustments may be used.

In various embodiments, the number of companies in a particular country can be rounded off to the nearest ten or five. For example, if in Country X it takes 73 companies to reach the target coverage threshold, the number for that country may be rounded off to 70 or 75, for example. The round-off which is closest to the desired market coverage may be used.

At inception of the index, the number of companies in the index from each country will likely differ. According to various embodiments, however, once set, the number will not change (subject to review), but the percentile coverage in each country should be close to the target market coverage, providing the benefit of consistent country representation. Also, since the number of companies in any particular country/region remains relatively fixed, this provides index stability. Also, because of the market cap constraints used to determine the constituent companies, the index achieves size integrity.

FIG. 13 is a chart showing an exemplary standard global index according to an embodiment of the present invention with Australia (AU), Hong Kong (HK), Singapore (SG), New Zealand (NZ), Japan (JP), Great Britain (GB), the EU less the UK (EU ex UK), Canada (CA) and the US as the constituent markets. To satisfy the standard index size constraint, the companies in the index have a market cap equal to or greater than USD 1.5 billion. In this example, the target market coverage is 85%. As can be seen, the number of companies from each country in the index varies from 750 to 5, but the market coverage is close to the target of 85%, except for smaller countries like New Zealand and Singapore, which do not have enough companies to satisfy the market cap size constraint.

In the chart of FIG. 13, the column denoted "Pac Ex Jp," signifying the Pacific region less Japan, shows the composite for AU, HK, SG and NZ. The column denoted "World" shows the composite for all of the constituent countries. As can be seen, this exemplary index would include 1,845 companies throughout the various countries, having a market coverage of 86.9%, with a minimum market cap (i.e., the market cap of the smallest company in the index) of USD 1.43 billion.

FIG. 14 is a chart for an exemplary index generated according to the method of FIG. 12 for a small-cap index. In this example, the market cap size constraint was defined as greater than USD 200 million (and excluding companies in the standard index). As can be seen from this chart, the new index includes 3975 companies, but yet the minimum market cap for the new index is USD 213 million. FIG. 15 is a chart showing the composites of FIGS. 13 and 14.

In various other embodiments, other parameters besides market capitalization could be used. For example, forecasted parameters may be used, including forecasted book value, forecasted gross revenue, forecasted gross sales, forecasted gross dividends, forecasted cash flow, forecasted total employment, etc., or any combination of such parameters. Also, the method may be used to generate indices for a group of developed countries, a group of emerging market countries, or a group of countries that include both developed and emerging market countries.

As shown in FIG. 16, a computer system 40 may be used to compute the index value. The computer system 40 may include a memory 42 and a processor 44. The memory 42 may include processing instructions for controlling the processor 44. The processing instructions may be implemented as software code to be executed by the processor using any suitable computer instruction type stored in the memory 42. The memory 42 may be embodied as any suitable computer-readable medium such as, for example, a RAM, a ROM, magnetic media such as a hard-drive or a floppy disk, or optical media such as a CD-ROM. The processor 44, when executing the processing instructions stored in the memory 42, may compute the index value using one or more of the processes described above. To compute the index value, the processor 44 may use data regarding the publicly traded companies that is stored in a database 46. The computer system 40 could be used to calculate the index value at inception and thereafter based on the performance of the stocks of the companies comprising the index, with such data being received by data feeds, for example, and stored in the database 46.

The memory 42 (or another memory) may also comprise instructions, which when executed by the processor 44, cause the processor to rebalance the global index at a periodic (e.g., semi-annual) rebalancing as described above. For example, at a rebalancing, the processor 44 may reset the universal minimum size reference, determine whether the companies in the index should be changed, and, if so, how they should be changed, as described above.

In another general aspect, the present invention is directed to issuing, selling, or buying shares in an investment fund that track the global index. An investment company (an issuer) may issues the shares. The investment company may track the performance of the index by holding in the portfolio of the investment fund all of the securities in the index, in the same proportions as the index. In another embodiment, the investment company may statistically sample the markets and hold in its fund portfolio "representative" securities whose performance is designed to replicate the performance of the index.

The securities may be issued to investors, who buy the securities. The investors may be individuals, funds, business entities, etc. The securities may also be bought and sold in an after market. In various embodiments, the investment fund may track a single global index in accordance with the present invention or it may track a number of indices, wherein at least one of the indices is a global index in accordance with the present invention.

While several embodiments of the invention have been described, it should be apparent, however, that various modifications, alterations and adaptations to those embodiments may occur to persons skilled in the art with the attainment of some or all of the advantages of the invention. For example, the steps of the processes described above may be performed in different or alternative orders in various embodiments, or certain steps could be combined. It is therefore intended to cover all such modifications, alterations and adaptations without departing from the scope and spirit of the present invention as defined by the appended claims.

What is claimed is:

1. A method for computing a value for a global market index based on stock prices of publicly traded companies in a plurality of markets, each market corresponding to a at least one geographic region, comprising:

determining, by a computer system, a minimum size range for the publicly traded companies for the index in terms of market capitalization, wherein the minimum size range has upper and lower bounds, wherein the computer system comprises a computer processor and a tangible memory, and wherein the computer system is in communication with a database that stores data regarding the publicly traded companies, wherein the minimum size range for each market is determined by:

computing the lower bound for the minimum size range by multiplying a minimum size reference by a first factor, wherein the minimum size reference corresponds to a market capitalization of a publicly traded company in the market whose market capitalization is at a target percentile of market capitalization for the market for the index; and computing the upper bound for the minimum size range by multiplying the minimum size reference by a second factor, wherein the second factor is greater than the first factor;

determining, by the computer system, a market coverage range for each geographic region of the market, wherein the market coverage range has upper limit market coverage percentile and lower limit market coverage percentile in terms of free float-adjusted market capitalization;

determining, by the computer system, a two-dimensional target area, bounded by the upper and lower bounds of the minimum size and the upper and lower limits of the market coverage range;

for each market that has one or more than one publicly traded company in the target area with (1) a market capitalization within the lower and upper bounds of the minimum size range and (2) a market capitalization within a market coverage range for the index, selecting, by the computer system, a threshold company from the one or more than one publicly traded company with a market capitalization meeting conditions (1) and (2) to be the smallest company, by market capitalization, in the index for the market; and computing the value of the index, by the computer system, based on market data for the companies comprising the index, wherein the companies comprising the index comprise, for each market, the threshold company for the market and publicly traded companies in the market having a market capitalization greater than the market capitalization of the threshold company.

2. The method of claim 1, wherein the first factor is less than one and the second factor is greater than one.

3. The method of claim 2, wherein first factor is 0.5 and the second factor is 1.25.

4. The method of claim 2, further comprising resetting, by the computer system, minimum size reference at a rebalancing of the global market index.

5. The method of claim 4, wherein prior to the rebalancing of the global market index, the index comprises n companies from at least one of the markets having one or more than one publicly traded company in the target area, and wherein resetting the minimum size reference comprises resetting, by the computer system, the minimum size reference to be the market capitalization of the nth largest company in the market at the time of the rebalancing.

6. The method of claim 2, wherein the computer system is programmed to determine the minimum size reference based on the $70^{th}$ percentile of the companies ranked according to their full market capitalization when the global market index is a large cap index.

7. The method of claim 2, wherein the computer system is programmed to determine the minimum size reference based on the $85^{th}$ percentile of the companies ranked according to their full market capitalization when the global market index is a standard index.

8. The method of claim 2 wherein the computer system is programmed to determine the minimum size reference based on the $99^{th}$ percentile of the companies ranked according to their full market capitalization when the global market index is an investable index.

9. The method of claim 1, wherein the upper limit market coverage percentile of the market coverage range is 65% and the lower limit market coverage percentile is 75% when the global market index is a large cap index.

10. The method of claim 1, wherein the upper limit market coverage percentile of the market coverage range is 80% and the lower limit market coverage percentile is 90% when the global market index is a standard index.

11. The method of claim 1, wherein the upper limit market coverage percentile of the market coverage range is 98.5% and the lower limit market coverage percentile is 100% when the global market index is an investable index.

12. The method of claim 1, further comprising rebalancing, by the computer system, the index, wherein rebalancing comprises adding or deleting no more than 5% of the companies included in the index during one rebalancing.

13. The method of claim 1, further comprising selecting, by the computer system, for each geographic region that has no publicly traded company in the target area, a threshold company having a market capitalization closest to and not less than the lower bound of the minimum size range.

14. The method of claim 1, wherein the computer system is programmed to compute the value of the index using a value-weighted index formula.

15. The method of claim 1, wherein the index comprises one or more developed markets and one or more emerging markets, and wherein the minimum size range for the developed markets is greater than the minimum size range for the emerging markets.

16. A system for computing a value for a global market index based on stock prices of publicly traded companies in a plurality of markets, each market corresponding to a at least one geographic region, comprising:

a database comprising tangible memory, the database storing data regarding publicly traded companies; and a computer processor in communication with the database for computing the index based on the data stored in the database by:

determining a minimum size range for the publicly traded companies for the index in terms of market capitalization, wherein the minimum size range has upper and lower bounds, wherein the minimum size range for each market is determined by:

computing the lower bound for the minimum size range by multiplying a minimum size reference by a first factor, wherein the minimum size reference corresponds to a market capitalization of a publicly traded company in the market whose market capitalization is at a target percentile of market capitalization for the market for the index; and computing the upper bound for the minimum size range by multiplying the minimum size reference by a second factor, wherein the second factor is greater than the first factor;

determining a market coverage range for each geographic region of the market, wherein the market coverage range has upper limit market coverage percentile and lower limit market coverage percentile in terms of free float-adjusted market capitalization;

determining a two-dimensional target area, bounded by the upper and lower bounds of the minimum size and the upper and lower limits of the market coverage range;

for each market that has one or more than one publicly traded company in the target area with (1) a market capitalization within the lower and upper bounds of the minimum size range and (2) a market capitalization within a market coverage range for the index, selecting a threshold company from one or more than one publicly traded company with a market capitalization meeting conditions (1) and (2) to be the smallest company, by market capitalization, in the index for the market; and computing the value of the index based on market data for the companies comprising the index, wherein the companies comprising the index comprise, for each market, the threshold company for the market and publicly traded companies in the market having a market capitalization greater than the market capitalization of the threshold company.

17. The system of claim 16, wherein the first factor is less than one and the second factor is greater than one.

18. The system of claim 17, wherein the first factor is 0.5 and the second factor is 2.25.

19. The system of claim 16, wherein the processor is for determining the threshold company for a geographic region that has no publicly traded companies in the target area by determining the company in the market having a market capitalization closest to and not less than the lower bound for the minimum size range.

20. A system for computing a value for a global market index based on stock prices of publicly traded companies in a plurality of markets, each market corresponding to a at least one geographic region, comprising:

a computer processor; and a tangible memory in communication with the computer processor that stores instructions for controlling the computer processor, the computer processor operative with the processing instructions for:

determining a minimum size range for the publicly traded companies for the index in terms of market capitalization, wherein the minimum size range has upper and lower bounds, wherein the minimum size range for each market is determined by:

computing the lower bound for the minimum size range by multiplying, a minimum size reference by a first factor, wherein the minimum size reference corresponds to a market capitalization of a publicly traded company in the market whose market capitalization is at a target percentile of market capitalization for the market for the index; and computing the upper bound for the minimum size range by multiplying the minimum size reference by a second factor, wherein the second factor is greater than the first factor;

determining a market coverage range for each geographic region of the market, wherein the market coverage range has upper limit market coverage percentile and lower limit market coverage percentile in terms of free float-adjusted market capitalization;

determining a two-dimensional target area, bounded by the upper and lower bounds of the minimum size and the upper and lower limits of the market coverage range;

for each market that has one or more than one publicly traded company in the target area with (1) a market capitalization within the lower and upper bounds of a the minimum size range and (2) a market capitalization within a market coverage range for the index, selecting a threshold company from the one or more than one publicly traded company with a market capitalization meeting conditions (1) and (2) to be the smallest, by market capitalization, in the index for the market; and computing the value of the index based on market data for the companies comprising the index, wherein the companies comprising the index comprise, for each market, the threshold company for the market and publicly traded companies in the market having a market capitalization greater than the market capitalization of the threshold company.

21. The system of claim 20, wherein the first factor is less than one and the second factor is greater than on.

22. The system of claim 21, wherein the first factors is 0.5 and the second factor is 3.25, and wherein the computer processor is for determining the lower and upper bounds by:

determining the lower bound to be 0.5 times the minimum size reference; and determining the upper bound to be 3.25 time the minimum size reference.

23. A tangible computer readable medium having instructions stored thereon which when executed by a processor cause the processor to determine a value for a global market index based on stock prices of publicly traded companies in a plurality of markets, each market corresponding to at least one geographic region, by:

determining a minimum size reference, wherein the minimum size reference corresponds to a market capitalization of a publicly traded company in the market whose market capitalization is at a target percentile of market capitalization for the market for the index;

determining a minimum size range for the publicly traded companies for in the index in terms of market capitalization, wherein the minimum size reference has upper and lower bounds, wherein the minimum size range for each market is determined by:

computing the lower bound for the minimum size range by multiplying the minimum size reference by a first factor; and computing the upper bound for the minimum size range by multiplying the minimum size reference by a second factor, wherein the second factor is greater than the first factor;

determining a market coverage range for each geographic region of the market, wherein the market coverage range has upper limit market coverage percentile and lower limit market coverage percentile in terms of free float-adjusted market capitalization;

determining a two-dimensional target area, bounded by the upper and lower bounds of the minimum size and the upper and lower limits of the market coverage range;

for each market that has one or more than one publicly traded company in the target area with (1) a market capitalization within the lower and upper bounds of the minimum size range and (2) a market capitalization within a market coverage range for the index, selecting a threshold company from the one or more than one publicly traded company with a market capitalization meeting conditions (1) and (2) to be the smallest company, by market capitalization, in the index for the market; and computing the value of the index based on market data for the companies comprising the index, wherein the companies comprising the index comprise, for each market, the threshold company for the market and publicly traded companies in the market having a market capitalization greater than the market capitalization of the threshold company.

24. The computer readable medium of claim 23, wherein the first factor is less than one and the second factor is greater than one.

25. The computer readable medium of claim 23, wherein the lower bound is 0.5 times the minimum size reference; and the lower bound is 4.25 times the minimum size reference.

* * * * *